(12) United States Patent
Maruyama (10) Patent No.: US 6,411,780 B1
(45) Date of Patent: Jun. 25, 2002

(54) CAMERA HAVING ELECTRONIC IMAGE-PICKUP CAPABILITY AND CAPABLE OF PERFORMING SELF-TIMER PHOTOGRAPHY

(75) Inventor: Atsushi Maruyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/535,414

(22) Filed: Mar. 24, 2000

(30) Foreign Application Priority Data

Mar. 31, 1999 (JP) .......................... 11-093793

(51) Int. Cl.[7] ....................... G03B 13/02; G03B 17/40; G03B 17/48
(52) U.S. Cl. ................... 396/59; 396/264; 396/374; 396/429; 348/64; 348/211; 348/333.01
(58) Field of Search ............................ 396/56, 57, 58, 396/59, 264, 302, 374, 429; 348/64, 211, 333.06, 333.07, 333.01

(56) References Cited

U.S. PATENT DOCUMENTS 4,757,388 A * 7/1988 Someya ...................... 348/211
6,085,048 A   7/2000 Mikoshiba et al. .......... 396/287

FOREIGN PATENT DOCUMENTS

| JP | 1-114169 | 5/1989 |
| JP | 7-74992 | 3/1995 |
| JP | 10-108054 | 4/1998 |

* cited by examiner

Primary Examiner—W. B. Perkey
(74) Attorney, Agent, or Firm—Frishauf, Holtz, Goodman, Langer & Chick, P.C.

(57) ABSTRACT

A camera comprises an electronic image-pickup apparatus and a silver-salt photography apparatus for recording a subject image on a silver-salt film. The electronic image-pickup apparatus comprises an area sensor for converting a subject image to an electric signal and an LCD monitor for displaying an image signal generated from the area sensor. The area sensor captures an image synchronously when the silver-salt photography apparatus records the subject image on the silver-salt film. When a self-timer photography mode setup switch is pressed to enable a self-timer photography mode, capturing an image through the area sensor and displaying the captured image on the LCD monitor are repeated during the self-timer photography mode.

10 Claims, 5 Drawing Sheets

CAMERA HAVING ELECTRONIC IMAGE-PICKUP CAPABILITY AND CAPABLE OF PERFORMING SELF-TIMER PHOTOGRAPHY

CROSS-REFERENCE TO RELATED APPLICATIONS

This application is based upon and claims the benefit of priority from the prior Japanese Patent Application No. 11-093793, filed Mar. 31, 1999, the entire contents of which are incorporated herein by reference.

BACKGROUND OF THE INVENTION

The present invention relates to a camera having an electronic image-pickup element for capturing a subject image and converting it to an electric signal and a monitor for displaying the image based on an image signal generated from the electronic image-pickup element.

Jpn. Pat. Appln. KOKAI Publication No. 7-074992 discloses an electronic camera having an electronic view finder. Basically, power is supplied to the electronic view finder of this electronic camera. When the self-timer photography starts, the electronic view finder is turned off.

Jpn. Pat. Appln. KOKAI Publication No. 1-114169 or Jpn. Pat. Appln. KOKAI Publication No. 10-108054 discloses a camera for both silver-salt photography and electronic photography. This camera is provided with an electronic image-pickup apparatus for converting a subject image to an electrical signal and a silver-salt photography apparatus for recording the subject image on a silver-salt film. This camera performs electronic image pickup in synchronization with silver-salt photography and displays a captured electronic image on a monitor.

When the electronic view finder is replaced by a monitor for the electronic camera disclosed in Jpn. Pat. Appln. KOKAI Publication No. 7-074992 and this system is applied to a silver-salt camera having a monitor, the monitor is always supplied with power. This power consumption shortens a battery life. A possible solution is to power the monitor only when a photography start signal (release signal) is generated. This makes it impossible to determine a composition by viewing the monitor in a self-timer photography mode.

Neither Jpn. Pat. Appln. KOKAI Publication No. 1-114169 nor Jpn. Pat. Appln. KOKAI Publication No. 10-108054 describes camera operations in the self-timer photography mode.

BRIEF SUMMARY OF THE INVENTION

The present invention incorporates these considerations and aims at providing a camera that allows an easy-to-use self-timer photography mode without consuming a camera battery.

According to a first aspect of the present invention, there is provided a camera, comprising:
  an electronic image-pickup apparatus having an electronic image-pickup element for capturing a subject image and converting it to an electric signal and a monitor for displaying the captured image based on an image signal generated from the electronic image-pickup element;
  a silver-salt photography apparatus for recording a subject image on a silver-salt film;
  self-timer photography mode setup means for enabling a self-timer photography mode; and
  control means for controlling the electronic image-pickup apparatus to perform a photography operation in synchronization with recording on the silver-salt film by means of the silver-salt photography apparatus, wherein
    capturing an image by means of the electronic image-pickup apparatus and displaying the captured image on the monitor are repeated while the self-timer photography mode setup means enable the self-timer photography mode.

According to a second aspect of the present invention, there is provided a camera comprising:
  silver-salt photography means for recording a subject image on a silver-salt film;
  electronic image-pickup means for capturing an image equivalent to an image recorded on the silver-salt film in synchronization with an operation of the silver-salt photography means;
  a monitor for displaying an image captured by the electronic image-pickup means; and
  self-timer photography mode setup means for enabling a self-timer photography mode that allows the silver-salt photography means to start an exposure after a specified time from a specified timing, wherein
    capturing an image by means of the electronic image-pickup means and displaying the captured image on the monitor are repeated while the self-timer photography mode setup means enable the self-timer photography mode.

According to a third aspect of the present invention, there is provided a camera, comprising:
  an electronic image-pickup element for capturing a subject image and converting it to an electric signal;
  a monitor for displaying the captured image based on an image signal generated from the electronic image-pickup element;
  a self-timer photography mode setup unit for enabling a self-timer photography mode; and
  a controller for executing a repetition of converting the subject image to an electric signal by means of the electronic image-pickup apparatus and displaying the image on the monitor while the self-timer photography mode setup unit enables the self-timer photography mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Embodiments of the present invention will be described in detail, with reference to the accompanying drawings.

1st Embodiment

Figure 1:
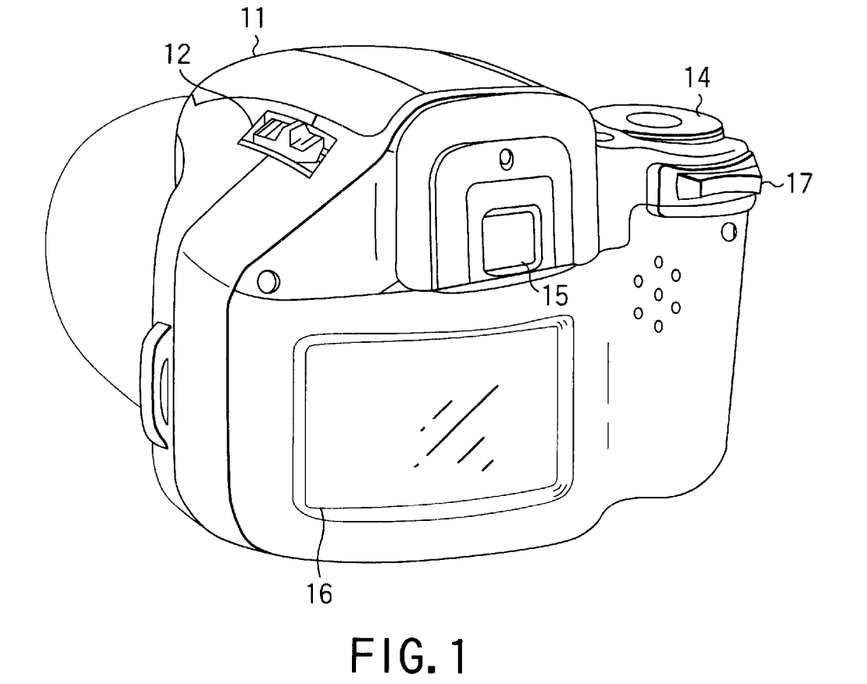
FIG. 1 is a rear perspective view showing an external view of a camera for both silver-salt photography and electronic photography to which a camera according to a first embodiment of the present invention is applied.
Figure 2:
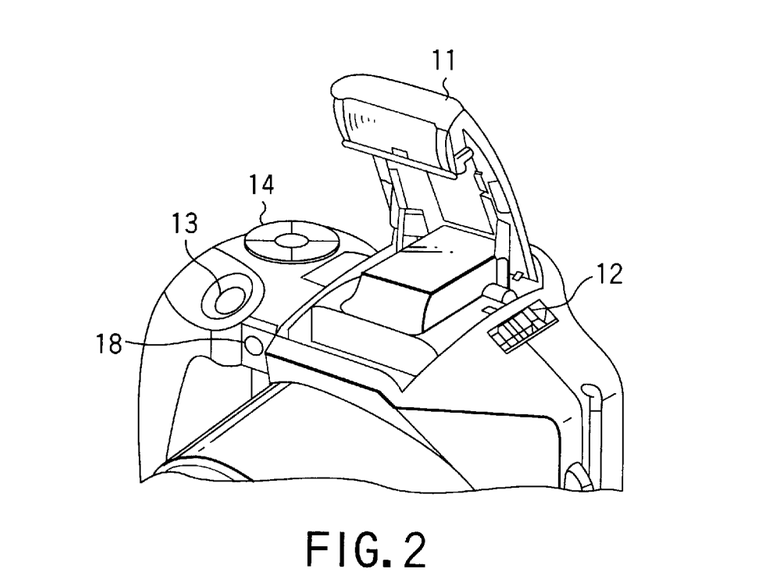
FIG. 2 is a perspective view showing that a strobe light unit pops up from the camera for the first embodiment.

FIGS. 1 and 2 show external views of a camera for both silver-salt photography and electronic photography to which a camera according to the first embodiment of the present invention is applied.

FIG. 1 is a perspective view showing the rear of the camera housing a strobe light unit 11. The upper left of the camera is provided with a power switch 12 that turns a camera power on or off. The upper right of the camera is provided with a release button 13 and a photography mode button 14. The release button 13 starts an operation of a silver-salt photography apparatus and an electronic image-pickup apparatus. The photography mode button 14 works as an operation switch for enabling or disabling a photography mode. The strobe light unit 11 can pop up from the camera and contains a strobe generator. The rear of the camera is provided with an eyepiece opening 15, a liquid crystal display (LCD) monitor 16, and a zoom-up/back operation button 17. The eyepiece opening 15 is used with an optical finder for viewing a subject image based on subject light passing through photographic lenses. The LCD monitor 16 displays the subject image based on a picture signal generated from an image-pickup element. The zoom-up/back operation button 17 is used for manually changing a focal length of a zoom lens.

FIG. 2 shows that the strobe light unit 11 pops up. It mechanically pops up synchronously when the power switch 12 is turned on. A remote control signal receiver opening 18 is provided at a specified location on the front of the camera for receiving a remote control signal from a remote control transmitter (not shown).

Figure 3:
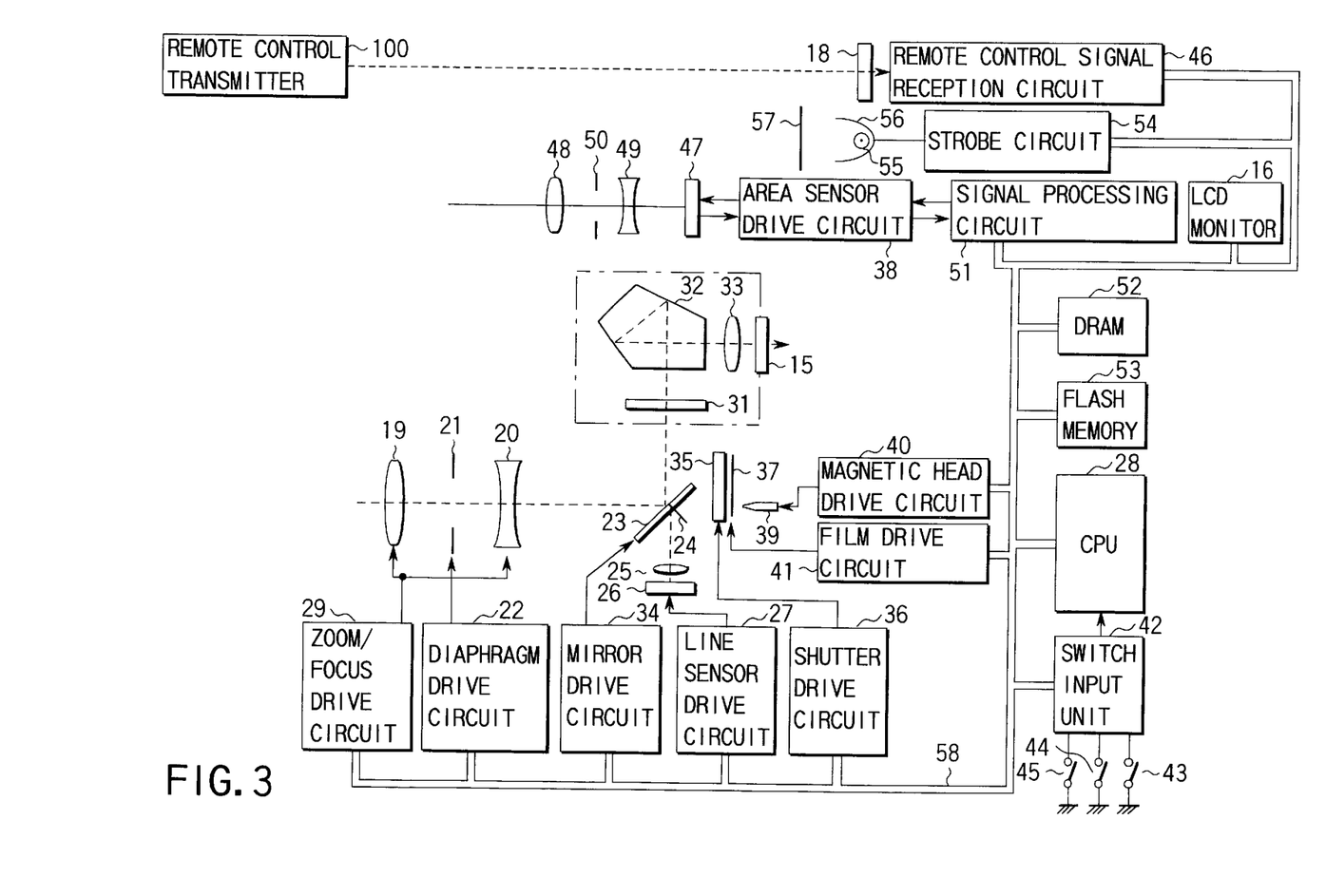
FIG. 3 is a block diagram of the camera for the first embodiment.

FIG. 3 is a block diagram of this camera for both silver-salt photography and electronic photography.

This camera for both silver-salt photography and electronic photography comprises a portion associated with a silver-salt photography apparatus and a portion associated with an electronic image-pickup apparatus.

First, the following describes the portion associated with the silver-salt photography apparatus as silver-salt photography means.

Photographic lenses include a positive lens 19 and a negative lens 20 for forming a subject image. A diaphragm mechanism 21 is placed between these photographic lenses. A diaphragm drive circuit 22 drives and controls the diaphragm mechanism 21. A movable mirror 23 is provided at the rear of the negative lens 20. An approximate center of the movable mirror 23 forms a half mirror. A sub-mirror 24 is provided at the rear center of the movable mirror 23 for reflecting the subject light downward. A separator optical system 25 comprising two optical systems is provided toward an optical axis direction (approximately toward a vertical direction in FIG. 3) of reflected light from the sub-mirror 24. The separator optical system 25 separates two images. A line sensor 26 is provided at a position where the separator optical system 25 forms a subject image. This line sensor 26 is connected to a line sensor drive circuit 27. The sub-mirror 24, the separator optical system 25, the line sensor 26, and the like configure a focus detection apparatus according to a known phase contrast method. Based on a signal received from the line sensor drive circuit 27, a CPU 28 as a controller finds a distance between two images and computes drive amount data for driving photographic lenses to a focusing position. This drive amount is transmitted to a zoom/focus drive circuit 29 and is used for changing focal points of the photographic lenses 19 and 20. This zoom/focus drive circuit 29 includes drive sources such as a known electromagnetic motor, ultrasonic motor, and the like, a driver circuit for controlling these drive sources, an encoder for detecting lens positions, and the like.

An optical finder 30 is provided along a reflected optical path from the movable mirror 23. The optical finder 30 comprises a focusing screen 31, a penta-prism 32, a finder eyepiece optical system 33, and the eyepiece opening 15. This embodiment uses the optical finder 30 in addition to the LCD monitor 16 for monitoring a subject. This is because the camera can be more stably held to easily prevent a camera shake when a camera operator takes a picture by viewing the optical finder 30 rather than the LCD monitor 16.

A mirror drive circuit 34 drives the movable mirror 23. A shutter drive circuit 36 drives a shutter 35. When the movable mirror 23 rises to release the shutter 35, a subject image is formed and recorded on a silver-salt film 37. The CPU 28 computes a diaphragm value for the diaphragm mechanism 21 and a shutter speed for an optimum exposure based on a subject luminance generated from an area sensor drive circuit 38 (described later), a film speed detected by a film speed detection circuit (not shown), and a program chart (not shown). The computed shutter speed drives and controls the shutter 35.

A magnetic recording layer (not shown) is developed on the silver-salt film 37. A magnetic head 39 is placed so that it touches the magnetic recording layer. The magnetic head 39 magnetically records various types of information. An output from a magnetic head drive circuit 40 drives the magnetic head 39. The camera also contains a film drive circuit 41. When a fame of photography is complete, the film drive circuit 41 winds the silver-salt film 37. The magnetic head 39 performs magnetic recording during this wind operation.

A switch input unit 42 comprises a plurality of switches including operation switches such as a first release switch 43 that turns on synchronously with a half press of the release button 13, a second release switch 44 that turns on synchronously with a full press of the release button 13, a self-timer photography mode setup switch 45, and a detection switch for mechanical operations. The self-timer photography mode setup switch 45 functions as a mode setup unit, self-timer photography mode setup means, and a self-timer photography mode release unit.

Generally, the self-timer photography mode starts recording on specified recording media after a specified time lapse from a specified timing. A specified timing here means a timing to operate the release button 13. Specified recording media include a silver-salt film for a silver-salt photography camera, or semiconductor memory, (optical) magnetic disk, and the like for an electronic image-pickup camera (also called an electronic camera or digital camera). In this embodiment, the specified timing also refers to a timing when a remote control signal reception circuit 46 including a photo sensor receives a normal remote control signal from a remote control transmitter 100 via the remote control signal receiver opening 18.

Then, the following describes the portion associated with the electronic image-pickup apparatus as electronic image-pickup means.

Photographic lenses include a positive lens 48 and a negative lens 49 for forming a subject image on an area sensor 47 as an electronic image-pickup element. A fixed diaphragm mechanism 50 is placed between these photographic lenses. The area sensor drive circuit 38 controls the area sensor 47, converts the formed subject image to an analog image signal, and outputs this signal to a signal processing circuit 51. The signal processing circuit 51 performs specified signal processing including conversion of the analog image signal to a digital signal.

An output from the signal processing circuit 51 is stored in DRAM 52 and is displayed on the LCD monitor 16. The DRAM 52 is volatile memory capable of high-speed writing. The signal processing circuit 51 can read the processed signal from the DRAM 52 at a specified timing for transferring and storing it in flash memory 53 (nonvolatile memory) and display a captured image on the LCD monitor 16. The flash memory 53 is electrically rewritable. When the power switch 12 is turned off, the electronic image written in the flash memory 53 is retained. The flash memory 53 is used for storing electronic images.

An angle of view for image-pickup for the image-pickup lenses 48 and 49 is almost same as that for the photography lenses 19 and 20 used for the silver-salt photography apparatus when these photography lenses provide shortest focuses (wide angles). When the zoom/focus drive circuit 29 changes focal lengths of the lenses 19 and 20, enlarging or reducing the processed electronic image (electronic zoom) causes an electronic image displayed on the LCD monitor 16 to be equivalent to a latent image recorded on the silver-salt film 37. An equivalent image here means an essentially same image, not a completely same image. Namely, it is impossible to generate precisely the same image due to a parallax and the like in actual processing. However, it is possible to generate almost the same image.

In the pop-up strobe light unit 11, an output from a strobe circuit 54 causes a discharge tube 55 to emit light. A reflector 56 reflects the emitted light. The reflected light is converged through a Fresnel lens 57 and is irradiated to the subject. An angle of view for strobe light emission is almost same as that for photography when the photography lenses 19 and 20 used for the silver-salt photography apparatus provide shortest focuses (wide angles).

Unquestionably, it is possible to match an angle of view for image-pickup for the area sensor 47 to an angle of view for strobe light emission in synchronization with a zoom operation of the photography lenses 19 and 20 used for the silver-salt photography apparatus.

A data bus 58 connects the above-mentioned diaphragm drive circuit 22, the line sensor drive circuit 27, the zoom/focus drive circuit 29, the mirror drive circuit 34, the shutter drive circuit 36, the magnetic head drive circuit 40, the film drive circuit 41, the remote control signal reception circuit 46, the signal processing circuit 51, the DRAM 52, the flash memory 53, and the strobe circuit 54 for exchanging data. The CPU 28 centrally controls operations of each of these circuits.

The following describes operations of the camera for both silver-salt photography and electronic photography according to this embodiment configured as mentioned above with reference to the flowchart in FIG. 4.

Figure 4:
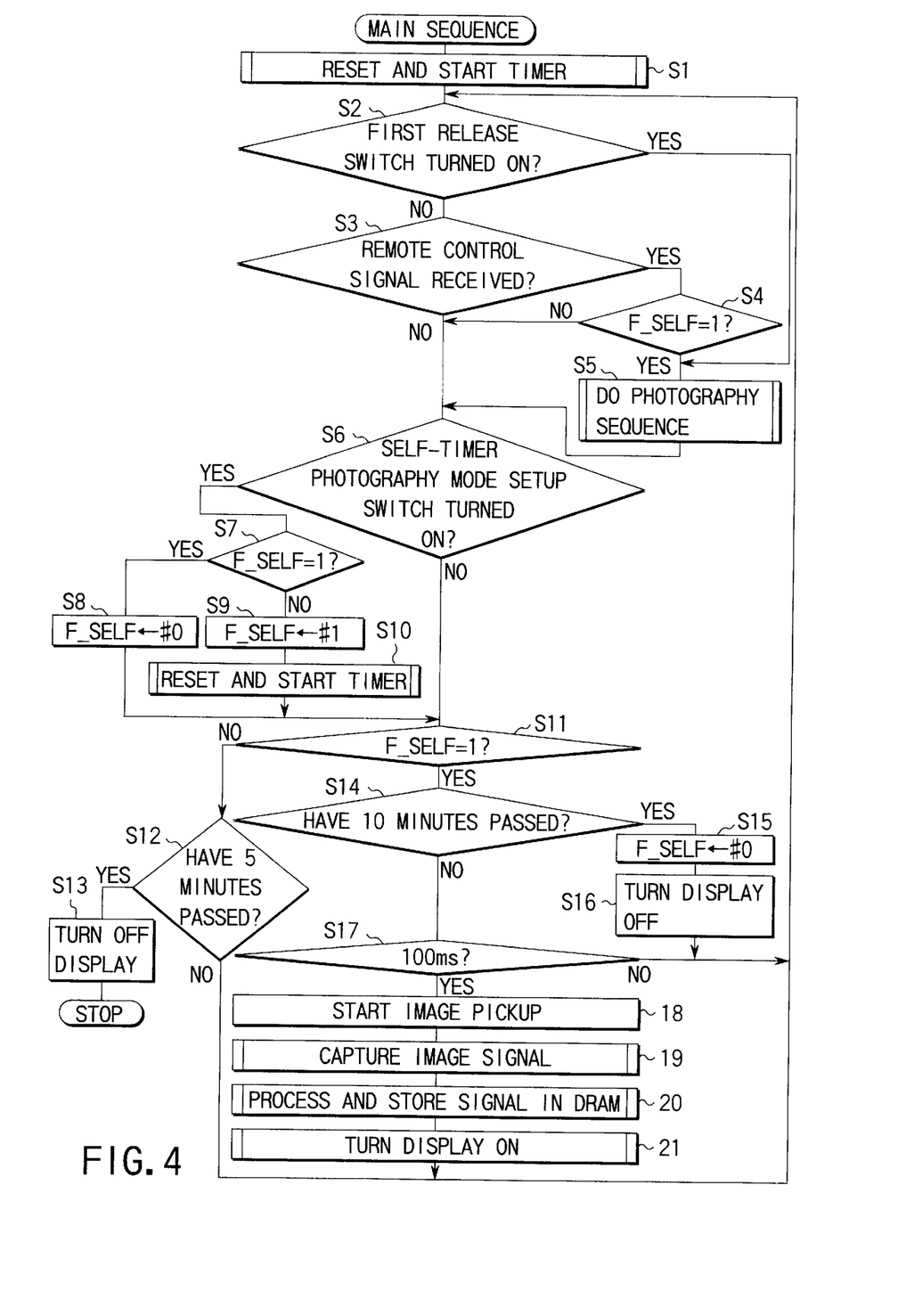
FIG. 4 is an operational flowchart of the camera for the first embodiment.

Turning on the power switch 12 of the camera initiates a sequence of this flowchart. A timer (not shown) in the CPU 28 is reset and started (step S1). This timer is a counter that is incremented at a specified interval. The counter starts counting the time when the counter value is zero-cleared (reset). Reading this counter value provides an elapsed time from a point when the counter starts counting.

Then, the CPU 28 checks if the first release switch 43 is activated (step S2). When the first release switch 43 is activated, execution is passed to step S5 to be described later. When the first release switch is inactive, the CPU 28 checks if the remote control signal reception circuit 46 has received a remote control signal (step S3).

When the remote control signal is received, the CPU 28 checks if flag F_SELF in the CPU 28 is set (step S4). Flag F_SELF is set when the camera is set to the self-timer photography mode. When flag F_SELF is set to 1, a photography sequence is executed (step S5). The photography sequence is described in details later. Namely, execution is passed to the photography sequence when the first release switch 43 is activated or when a remote control signal is received in the self-timer photography mode. Namely, a remote control signal can be accepted only when the camera is set to the self-timer photography mode.

When no remote control signal is received in step S3 or when a remote control signal is received with the self-timer photography mode not set in step S4, the CPU 28 checks if the self-timer photography mode setup switch 45 is activated (step S6).

When the self-timer photography mode setup switch 45 is activated in step S6, the CPU 28 checks if flag F_SELF is set to enable the self-timer photography mode currently (step S7). When the self-timer photography mode is already enabled, flag F_SELF is cleared to disable the self-timer photography mode (step S8). When the self-timer photography mode is not enabled, flag F_SELF is set to enable the self-timer photography mode (step S9), and the timer is reset to start (step S10).

After flag F_SELF is cleared at step 8, after the timer is reset to start at step S10, or when the self-timer photography mode setup switch 45 is not enabled at step S6, the CPU 28 checks if flag F_SELF is set (step S11).

When flag F_SELF is not set at step S11, the CPU 28 checks if the counter value is greater than or equal to five minutes after the timer starts counting (step S12). When the counter value is smaller than five minutes, execution returns to step S2, repeating the same processing. When the counter value is greater than or equal to five minutes, execution proceeds to so-called a stop mode. This mode issues an instruction to turn off the indication, turns off the LCD monitor 16 (step S13), and then stops the CPU 28. The stop mode is released by operating the power switch 12, the release button 13, the photography mode button 14, and the like. In step S13, the indication is turned off independently of whether the LCD monitor is turned on. Apparently, it is possible to turn off the indication only when the LCD monitor is turned on.

When flag F_SELF is set at step S11, the CPU 28 checks if the counter value is greater than or equal to 10 minutes after the timer starts counting (step S14). When the counter value is greater than or equal to 10 minutes, flag F_SELF is cleared to disable the self-timer photography mode (step S15), the LCD monitor 16 is turned off (step S16), and then execution returns to step S2.

When the counter value is smaller than 10 minutes, the CPU 28 checks if the timer counted the next 100 ms (step S17). When the timer does not count 100 ms, execution returns to step S2. When the timer has counted 100 ms, step 18 and a succeeding sequence are performed every 100 ms.

An image-pickup instruction signal is issued to the area sensor drive circuit 38 (step S18). The area sensor drive circuit 38 controls image-pickup operations. In response to the image-pickup instruction signal, the area sensor drive circuit 38 allows the area sensor 47 to start an image-pickup operation. When the area sensor 47 completes the image-pickup operation, the area sensor drive circuit 38 sends a capture enable signal to the signal processing circuit 51. When receiving this capture enable signal, the signal processing circuit 51 captures an analog image signal from the area sensor 47 and converts it to digital image data according to a known method (step S19). The digital image data is processed according to specified signal processing such as a conversion to display data, and then is transmitted to and stored in the DRAM 52 (step S20). A display operation is directed to the signal processing circuit 51. The LCD monitor 16 is turned on and displays the captured image (step S21). Then, execution returns to step S2 to repeat the same processing. In step S21, a power-on operation for the LCD monitor 16 takes place only for the first sequence. Because the LCD monitor 16 is already turned on for the second and succeeding sequences, a power-on operation is omitted and the displayed image is just updated. Accordingly, an image-pickup operation occurs every 100 ms and the captured image is displayed on the LCD monitor 16.

The camera operates as follows according to the above-mentioned processing.

Execution is passed to a photography sequence (described later) when the first release switch 43 is pressed according to step S2 or S5, or when the remote control signal reception circuit 46 receives a specified remote control signal.

Processing in step S6 or S10 enables or disables the self-timer photography mode each time the self-timer photography mode setup switch 45 is operated.

Processing for step S17 or S21 sets the camera to the self-timer photography mode. After the camera enters the self-timer photography mode, an image-pickup operation occurs repeatedly every 100 ms. A captured image is displayed on the LCD monitor 16. A camera operator can easily set a composition by viewing a display on the LCD monitor 16. When determining the composition, the camera operator can press the first release switch 43, and then move to the inside of an area corresponding to the determined composition to photograph himself or herself as well. Alternatively, when determining the composition, the camera operator can move to the inside of an area corresponding to the determined composition, and then operate the remote control transmitter 100 to allow the remote control signal reception circuit 46 to receive a specified remote control signal for photographing himself or herself as well.

The self-timer photography mode turns off 10 minutes later after processing for step S14 or S16 enables this mode. The display of the LCD monitor 16 also turns off, thus minimizing the battery consumption.

Further, the stop mode takes effect five minutes later to minimize the battery consumption when no operation occurs after steps S12 and S13. When execution proceeds to step S12 ten minutes later after the self-timer photography mode is enabled, the decision whether five minutes have passed results in YES because ten minutes have already passed. The stop mode takes effect immediately.

Figure 5:
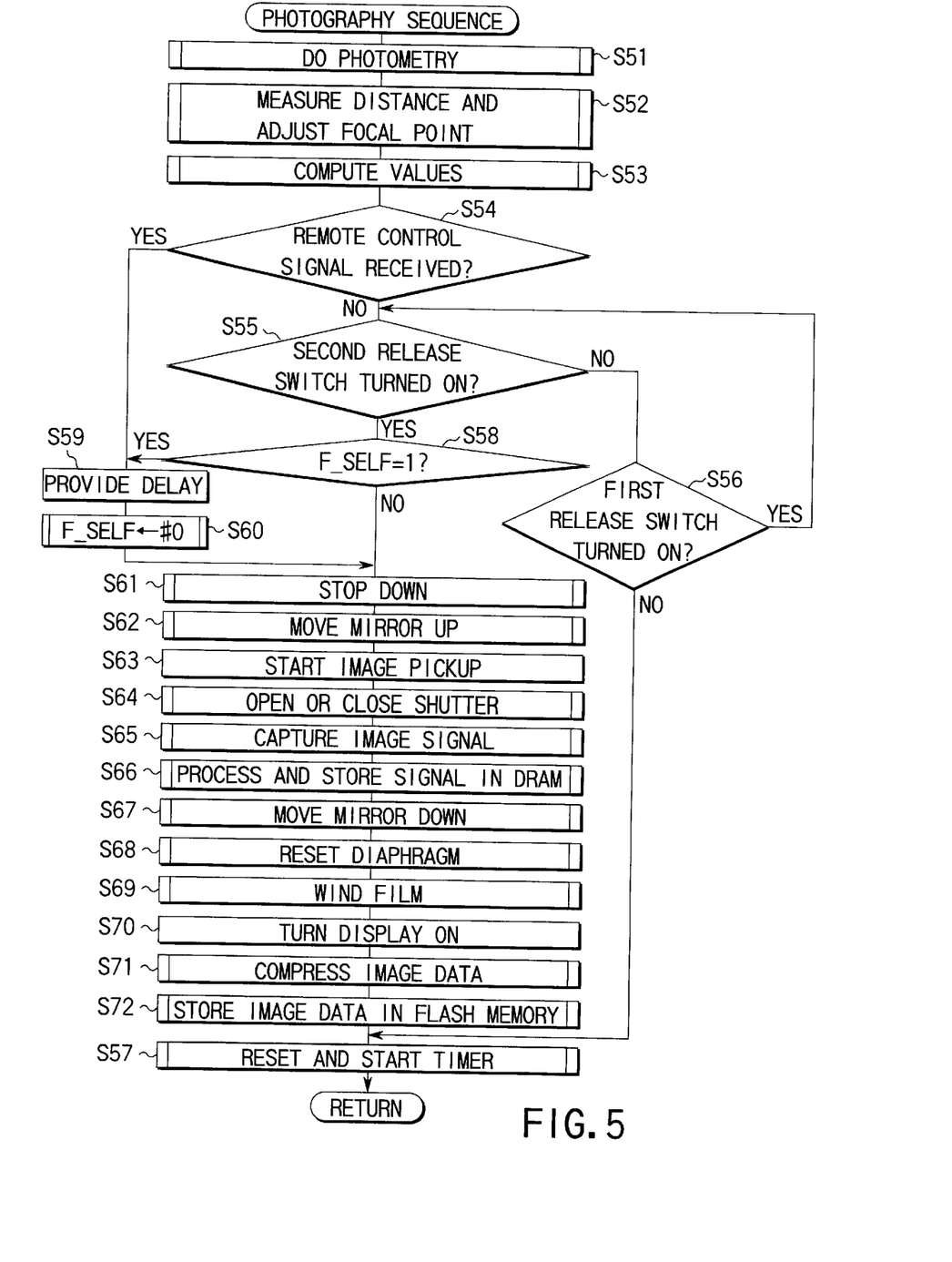
FIG. 5 is a flowchart of a photography sequence subroutine in FIG. 4.

The following describes a photography sequence subroutine that is called at step S5 with reference to FIG. 5.

The area sensor 47 performs photometry and the area sensor drive circuit 38 outputs a subject brightness value (step S51). This value is entered to the CPU 28 via the signal processing circuit 51. The CPU 28 finds a distance between two images based on a signal entered via the line sensor drive circuit 27 and computes drive amount data for moving photography lenses to focusing positions (step S52). The drive amount data is transferred to the zoom/focus drive circuit 29 to update focusing positions for photography lenses 19 and 20. The CPU 28 computes a diaphragm value and a shutter speed for the diaphragm mechanism 21 that provides an optimum exposure according to a known art (step S53). This computation is based on the subject brightness value found at step S51, the program chart and the like (not shown), and a film speed detected by the film speed detection circuit (not shown).

The CPU 28 checks if the remote control signal reception circuit 46 receives a remote control signal (step S54). Namely, this step determines whether the photography sequence is called due to reception of a remote control signal with the camera set to the self-timer photography mode or is called just due to an operation of the first release switch 43.

When no remote control signal is received, namely, when the photography sequence is called due to an operation of the first release switch 43, the CPU 28 checks a state of the second release switch 44 (step S55). When this switch remains off, the CPU 28 checks a state of the first release switch 43 (step S56). When the first release switch 43 also remains off, the CPU 28 resets and starts the timer (step S57) and execution returns to the main routine in FIG. 4. When the first release switch 43 is turned on, execution returns to step S55.

When step S55 determines that the second release switch 44 is turned on, the CPU 28 checks if flag F_SELF is set (step S58). When flag F_SELF is set or when step S54 determines that a remote control signal is received, the CPU 28 provides a delay (step S59). Then, the CPU 28 zero-clears flag F_SELF to release the self-timer photography mode (step S60). The delay is approximately ten seconds for the self-timer photography mode when the release button 13 is pressed. Alternatively, the delay is approximately three seconds for the remote control photography. A self-timer indication (not shown) blinks at a specified interval until the delay expires.

After this state or when flag F_SELF is not set at step S58, an output from the diaphragm drive circuit 22 stops the diaphragm mechanism 21 down to an aperture value computed at step S53 (step S61). Thereafter, an output from the mirror drive circuit 34 places the movable mirror 23 outside a photographic optical path (step S62).

Concurrently, the CPU 28 sends an image-pickup instruction signal to the area sensor drive circuit 38 (step S63). The area sensor drive circuit 38 controls image-pickup operations. In response to the image-pickup instruction signal, the area sensor drive circuit 38 allows the area sensor 47 to start an image-pickup operation. When the area sensor 47 completes the image-pickup operation, the area sensor drive circuit 38 sends a capture enable signal to the signal processing circuit 51.

An output from the shutter drive circuit 36 drives the shutter 35 to provide a shutter speed value computed at step S53 (step S64).

When receiving the capture enable signal, the signal processing circuit 51 captures an analog image signal from the area sensor 47 and converts the analog image signal to digital image data according to a known method (step S65). The digital image data is processed according to specified signal processing such as a conversion to display data, and then is transmitted to and stored in the DRAM 52 (step S66).

Because the movable mirror 23 is moved at step S62, the CPU 28 restores the movable mirror 23 to a normal position within the photographic optical path (step S67). Because the diaphragm mechanism 21 stops down at step S61, the CPU 28 restores the diaphragm mechanism 21 to a free state (step S68). Then, an output from the film drive circuit 41 winds the silver-salt film 37 for one frame (step S69). At this time, the magnetic head 39 magnetically records specified data on a magnetic recording layer of the silver-salt film 37 according to a known art. A detailed description about this art is omitted.

Thereafter, the CPU 28 issues a display operation to the signal processing circuit 51, turns on the LCD monitor 16, and displays the captured image on the LCD monitor 16 (step S70). When the LCD monitor 16 is already turned on at step 70, the captured image is simply updated without the power-on operation. Then, the CPU 28 compresses the digital image data stored in the DRAM 52 (step S71) and stores the compressed digital image data in the flash memory 53 (step S72). Then, execution proceeds to step S57, resets to start the timer, and returns to the main routine in FIG. 4.

The photography sequence subroutine described above allows the LCD monitor 16 to display a captured photographic image.

Instead of a captured image that is displayed and updated every 100 ms as described above, the self-timer photography mode allows the LCD monitor 16 to display a photographic image that is taken in synchronization with the self timer. In step S60, flag F_SELF is cleared to release the self-timer photography mode.

2nd Embodiment

The following describes the second embodiment of the present invention.

The second embodiment employs the same camera configuration and main routine operations as those for the first embodiment. Accordingly, the description about the camera configuration and main routine operations is omitted here.

Figure 6:
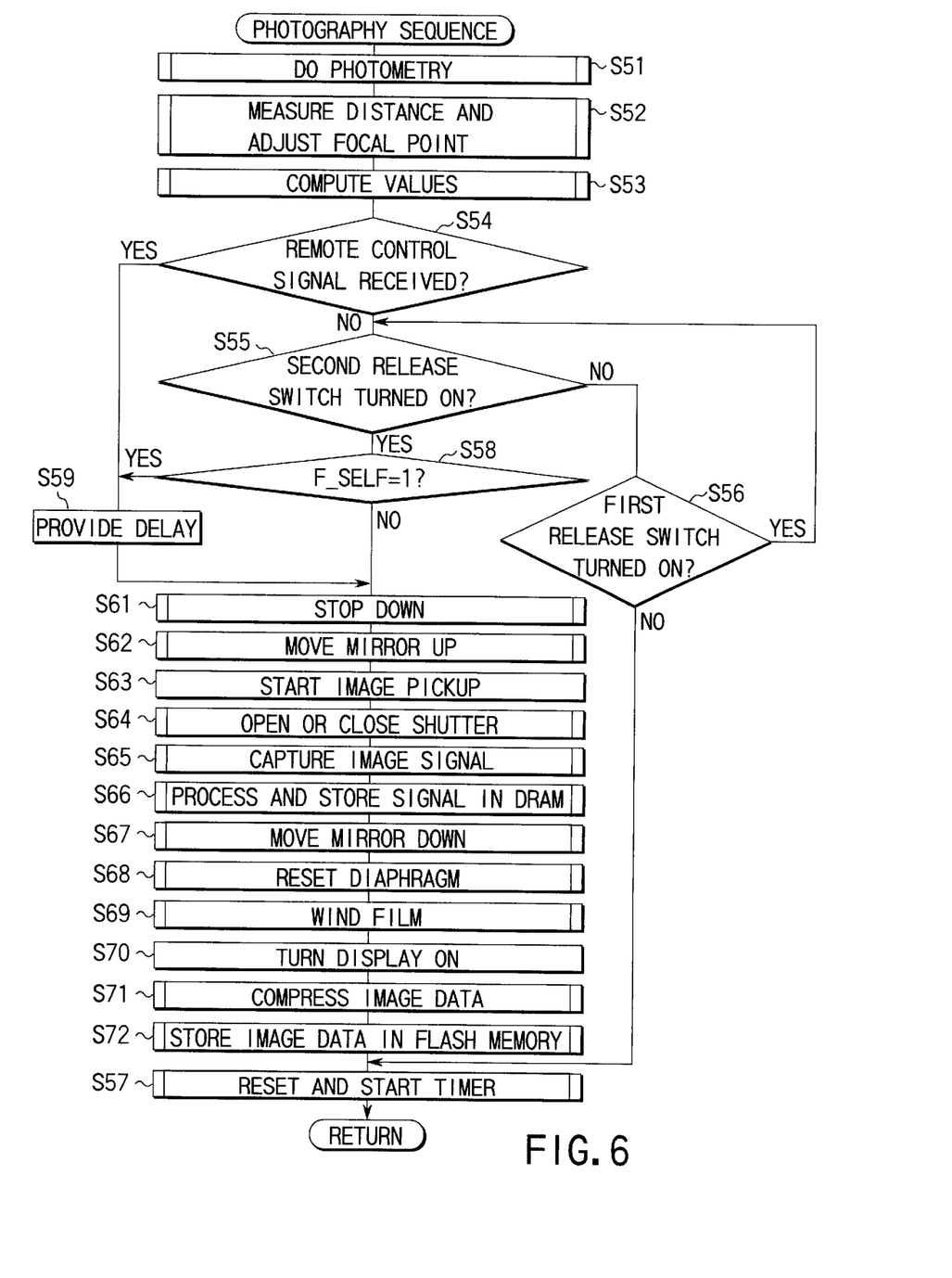
FIG. 6 is a flowchart of a photography sequence subroutine in a camera for both silver-salt photography and electronic photography to which a camera according to a second embodiment of the present invention is applied.

FIG. 6 shows a photography sequence subroutine for the camera for both silver-salt photography and electronic photography to which a camera according to the second embodiment of the present invention is applied. This subroutine is void of step S60 for clearing flag F_SELF that is found in the photography sequence subroutine for the first embodiment.

Omitting step S60 maintains the self-timer photography mode even after performing the self-timer photography in this mode. When the self-timer photography requires a plurality of successive frames, it is unnecessary to repeatedly press the photography mode button 14.

Obviously, the second embodiment makes it possible to omit step S70 that displays the captured image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera, comprising:

an electronic image-pickup element for capturing a subject image and converting it to an electric signal;

a monitor for displaying the captured image based on an image signal generated from said electronic image pickup-element;

a self-timer photography mode setup unit for enabling a self-timer photography mode; and a controller for executing a repetition of converting the subject image to an electric signal by means of said electronic image-pickup apparatus and displaying the image on said monitor only when said self-timer photography mode setup unit enables the self-timer photography mode.

2. The camera according to claim 1, further comprising:

an optical finder for viewing a subject.

3. The camera according to claim 1, further comprising:

a timer for counting a time interval elapsed from the time when said self-timer photography mode setup unit enables the self-timer photography mode, and wherein said controller inhibits the repetitive operation when the timer has counted a specified time interval.

4. The camera according to claim 1, further comprising:

a timer for counting a time interval elapsed from the time when said self-timer photography mode setup unit enables the self-timer photography mode, and wherein said controller cancels the self-timer photography mode when said timer has counted a specified time interval.

5. The camera according to claim 1, further comprising:

a photography mechanism for recording a subject image on a silver-salt film;

an instruction mechanism for initiating an exposure by means of said photography mechanism; and a controller for allowing said photography mechanism to initiate an exposure based on an output from said instruction mechanism.

6. The camera according to claim 5, wherein said instruction mechanism is a remote control signal reception circuit that receives a remote control signal from a remote control transmitter.

7. The camera according to claim 1, further comprising:

a self-timer photography mode release unit for releasing the self-timer photography mode enabled by said self-timer photography mode setup unit.

8. The camera according to claim 7, wherein said self-timer photography mode release unit releases the self-timer photography mode upon completion of one frame of photography in the self-timer photography mode.

9. The camera according to claim 7, wherein said self-timer photography mode release unit releases the self-timer photography mode when said timer has counted a specified time interval.

10. The camera according to claim 9, wherein said self-timer photography mode release unit includes an operation switch for accepting an operator's release instruction and releases the self-timer photography mode in response to an operation of the operation switch.

* * * * *